United States Patent [19]

Mahaffey, Jr.

[11] 4,419,473

[45] Dec. 6, 1983

[54] POLYOLEFIN PLASTIC COMPOSITIONS HAVING IMPROVED TRANSPARENCY

[75] Inventor: Robert L. Mahaffey, Jr., Inman, S.C.

[73] Assignee: Milliken Research Corporation, Spartanburg, S.C.

[21] Appl. No.: 380,370

[22] Filed: May 20, 1982

Related U.S. Application Data

[63] Continuation-in-part of Ser. No. 275,561, Jun. 22, 1981, abandoned.

[51] Int. Cl.$^3$ .............................................. C08K 5/34
[52] U.S. Cl. ................................... 524/104; 524/114; 524/120; 524/246; 524/247; 524/259; 524/367; 524/387; 524/388; 524/400; 524/372; 524/373
[58] Field of Search ............... 524/388, 387, 120, 104, 524/246, 372, 373

[56] References Cited

U.S. PATENT DOCUMENTS 3,721,682 3/1973 Murai et al. ........................ 549/364
3,901,859 8/1975 Alberti et al. ....................... 524/388
4,016,118 4/1977 Hamada et al. ..................... 523/100

FOREIGN PATENT DOCUMENTS 52-152442 12/1977 Japan .
54-4069155 6/1979 Japan .

Primary Examiner—Joseph L. Schofer
Assistant Examiner—N. Sarofim
Attorney, Agent, or Firm—H. William Petry; Terry T. Moyer

[57] ABSTRACT

A polyolefin plastic composition is provided having improved transparency, which comprises:
(a) a major portion of a linear, low density polyethylene polymer;
(b) a di-acetal of sorbitol and an aromatic aldehyde in an amount sufficient to improve transparency characteristics; and
(c) a di-acetal decomposition inhibitor in an amount sufficient to inhibit decomposition of said di-acetal.

7 Claims, No Drawings

POLYOLEFIN PLASTIC COMPOSITIONS HAVING IMPROVED TRANSPARENCY

This application is a continuation-in-part of co-pending application Ser. No. 275,561 filed June 22, 1981, now abandoned.

This invention relates to a polyolefin plastic composition having improved transparency characteristics.

Polyolefins, for example polyethylene or polypropylene, have found a wide range of applications as packaging materials and containers in the form of films, sheets, or hollow articles; but because of their poor transparency, their use has been limited. In particular, they are unsuitable as packaging materials or containers for such articles as are desired to be visible through them (e.g., cosmetics or foodstuffs).

Attempts have been made to improve the transparency of polyolefins by incorporating certain kinds of additives in them. For instance, para-t-butylbenzoic acid, its salts, low molecular weight waxy polyethylene, and low molecular weight waxy polypropylene have been suggested as such additives. These conventional additives, however, are unable to bring about a sufficient improvement of the transparency because they deteriorate the mechanical and chemical properties of the products, or have poor miscibility with the polyolefins.

More recently, as described in U.S. Pat. No. 4,016,118 to Hamada et al, a polyolefin plastic composition having improved transparency and reduced molding shrinkage characteristics has been proposed which contains the compound dibenzylidene sorbitol. Other additives have been proposed in U.S. Ser. No. 143,258 filed Apr. 24, 1980 (incorporated by reference), which may further improve the transparency of polyolefins even as compared to the previously known product dibenzylidene sorbitol. Such products also may not deteriorate the mechanical and chemical properties of the final product. Basically, these additives are also di-acetals of sorbitol wherein the benzene ring or rings of the aldehyde moiety is substituted in either or both of the meta and para positions with a chlorine or bromine atom.

While the aforementioned di-acetal type compounds have been superior additives to those previously known for improving the transparency characteristics of polyolefin plastic compositions, it would be desirable to even further improve the transparency of such compositions without adversely affecting the mechanical and chemical properties of the final products.

Accordingly, the present invention provides plastic compositions having transparency characteristics that may be even further improved as compared to previously known, commercially available products. Furthermore, the physical and chemical properties of the final products may not necessarily or undesirably be diminished and may in fact be improved as compared to known plastic compositions.

According to the present invention, a polyolefin plastic composition having improved transparency is provided which comprises:

(a) a major portion of a linear, low density polyethylene polymer;

(b) a di-acetal of sorbitol and an aromatic aldehyde in an amount sufficient to improve transparency characteristics; and (c) a di-acetal decomposition inhibitor in an amount sufficient to inhibit decomposition of said di-acetal.

The di-acetal of the present invention may be a condensation product of sorbitol and benzaldehyde, e.g., dibenzylidene sorbitol; it may be a condensation product of sorbitol and a substituted benzaldehyde. Since the sorbitol moiety is substituted with two aldehyde moieties the individual di-acetal product compound may be a mixed aldehyde, that is it may include, for instance, one unsubstituted benzaldehyde substituent and one substituted benzaldehyde substituent, or it may include two different substituted benzaldehydes. Substituents which may be employed on the substituted benzaldehyde moiety in any of the ortho, meta and para positions include, for instance, lower alkyl, e.g., having from 1 to about 5 carbon atoms; hydroxy; methoxy; mono- and di-alkylamino; amino; and halogen, e.g., fluorine, chlorine, and bromine. Preferred di-acetals of the present invention include dibenzylidene sorbitol; di-p-chlorobenzylidene sorbitol; di-m-chlorobenzylidene sorbitol; O-benzylidene-O-p-chlorobenzylidene sorbitol; di-m-bromobenzylidene sorbitol; bis(3,4-dichlorobenzylidene) sorbitol; and di-tolylidene sorbitol. The most preferred di-acetal is di-p-chlorobenzylidene sorbitol.

The di-acetals of the present invention may be conveniently prepared by a variety of techniques, some of which are known in the art. Generally, such procedures employ the reaction of one mole of D-sorbitol with about two moles of aldehyde in the presence of an acid catalyst. The temperature employed in the reaction will vary widely depending upon the characteristics, such as melting point, of the aldehyde or aldehydes employed as a starting material in the reaction. The reaction medium may be an aqueous medium or a non-aqueous medium. One very advantageous method which can be employed to prepare the di-acetals of the invention is described in U.S. Pat. No. 3,721,682, to Murai et al. (incorporated by reference). While the disclosure of the patent is limited to benzylidene sorbitols, it has been found according to the present invention that substituted di-acetals as disclosed herein may also be conveniently prepared by the method described therein.

The di-acetals of sorbitol of the present invention prepared by the above techniques may contain a minor or even a major portion of by-product mono-acetal and tri-acetal as impurities. Although it may not always be necessary to remove these impurities prior to incorporation of the di-acetal into the polyolefin, it may be desirable to do so and such purification may serve to enhance the transparency of the resin produced thereby. Purification of the di-acetal may be accomplished, for instance, by removal of tri-acetal impurities by the extraction thereof with a relatively non-polar solvent. By removal of the impurities, the product may be purified so that the amount of di-acetal in the additive composition is at least about 90 percent and even up to about 95 percent di-acetal or more.

The proportion of di-acetal in the composition of this invention is an amount sufficient to improve the transparency of the composition, generally from about 0.01 to about 5 percent by weight, preferably about 0.1 to about 2 percent by weight, based upon the total weight of the composition. When the content of di-acetal is less than about 0.01 percent by weight, the resulting composition may not be sufficiently improved in respect to transparency characteristics. When the content of di-acetal is increased beyond about 2 percent by weight, no additional advantage may be observed.

The polyolefin polymers of the present invention are linear, low density polyethylene polymers (LLDPE), such as Union Carbide's G-Resin ®7144. LLDPE polymers have been developed as a result of research into catalyst systems which have permitted the polymerization of ethylene with a small amount of a comonomer at lower pressures and temperatures than were used previously. Such processing provides a resin having fewer and shorter sidechains on the polymer chain and greater durability than the conventional high pressure polyethylene resins.

Catalyst systems used for the production of such polyolefin polymers usually are of the Ziegler-Natta type which may employ titanium tetrachloride and trialkylaluminum compounds. In addition at least one other metallic species, for instance, magnesium chloride, may be added to cause the resulting polymer to have the desired characteristics. Moreover, the catalyst may be impregnated on a support such as silica. Such a system has been disclosed by Kiu Hee Lee and Gary Stanley Cieloszyk in European Patent Application EP No. 43,220, Jan. 6, 1982 (U.S. application Ser. No. 163,959, June 30, 1980). Other metals may also be used in the catalyst system including vanadium, copper and zirconium.

When the polymerization is complete, it is usually necessary to at least partially remove or deactivate the catalyst residue which is acidic in nature and can seriously affect the performance of the resin or various stabilizing additives compounded into it. For instance, the interaction of antioxidants with catalyst residues in polyolefins has been studied by J. E. Kresta, Tech. Pap. Reg. Tech. Conf. Soc. Plast. Eng., 1980, 478. The removal or deactivation of the catalyst or acidic species may be accomplished in a number of ways including but not limited to treatment of the crude polymer with alcohols, olefins, epoxides, esters, ammonia, phosphorus acid esters, or steam. It is believed these treatments serve to inactivate the offending species in the polymer by one of the following mechanisms: sequestering the metals by coordination rendering them inactive, reacting with the metal chlorides present and/or neutralizing the hydrogen chloride which can be produced from them, or physically washing away the acidic species. While this process serves to reduce the amount of harmful species present in the polymer, it may not be totally efficient. Thus there may generally be a certain amount of residual catalyst present which can be potentially harmful to the polymer directly or indirectly by reaction with stabilizing additives.

It is theorized (although the invention is not to be limited thereby) that the catalyst residues are responsible for the lack of clarity improvement when certain otherwise effective di-acetals are incorporated into polyolefins and copolymers which have a high catalyst residue. Such lack of clarity improvement is particularly noticeable in certain polyethylenes which have ash contents greater than 500 ppm. In these cases the decomposition of the di-acetal is obvious by the characteristic odor emanating from the resin after it has been processed with the di-acetal. This odor is due to the aldehydes from which the acetal is derived. In addition the aldehyde can be quantitatively determined by extraction of the polymer with a suitable solvent and analysis of the extract by liquid chromatography.

It has been found that the addition of certain co-additives along with the di-acetal in polyolefins having high catalyst residues enables the achievement of improved clarity over that obtained using the di-acetal alone. These co-additives may serve as acid acceptors and/or metal deactivators which prevent acidic species and/or metals in the polymer from catalyzing the decomposition of the di-acetal.

Di-acetals are typically unstable in the presence of acids and particularly so when water is also present, for instance, from the atmosphere. Consequently, these co-additives, herein referred to as di-acetal decomposition inhibitors, are provided in the composition in an amount sufficient to inhibit decomposition of the di-acetal compound, e.g., from about 0.01 percent to about 2 percent, preferably about 0.05 percent to about 1 percent by weight based on the weight of the composition. As used herein the term "hinder" means to retard or reduce. It does not require the total or complete prevention or elimination of the undesired phenomenon referred to, but simply means that such phenomenon occurs to a lesser extent than it would otherwise occur.

Acids which may catalyze this decomposition may be of two general types, either one which when dissolved in water gives a pH of less than 7 such as hydrogen chloride or a molecule or ion such as Ti(IV) which can accept a pair of electrons from a donor atom. These latter acids are known as Lewis acids.

As a result of these high amounts of residual acids present in certain polyolefins an acid acceptor may be employed along with the di-acetal to achieve improved clarity. The acid acceptor may be classified in several ways, for instance; (1) a substance which may coordinate with or sequester an acidic molecule or ion to prevent the acid from reacting further in an undesirable way; (2) a substance which can react with the acid to give a harmless salt; or (3) a substance which can react with an acid to give a neutral compound which cannot react further in an undesirable way. The acid acceptor itself of course must not impart any haze to the polyolefin. Also, the acid acceptor may function by more than one of the above mechanisms.

Examples of Class 1 above include, e.g., phosphites, carboxylic acid salts, especially fatty acid salts, amines, especially fatty amines, alkanol amines and hindered amines (e.g., Tinuvin ® 770), salts of amino acids, polyalkylene glycols, phosphates, phosphines, hydroxy carbonyl compounds, dicarbonyl compounds, e.g., acetylacetone, polyhydroxy compounds, crown ethers, hydrazones and hydrazides. Typical Class 1 type complexes are shown below:

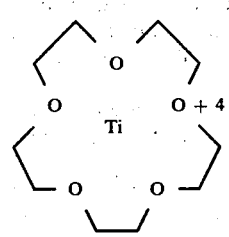

A

Ti(S₂CN(CH₃)₂)₄    B

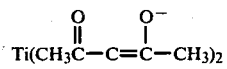

C

Examples of Class 2 include amines and other bases which may neutralize acids such as hydrogen chloride as illustrated below:

$$HCl + (C_4H_9)_3N \rightarrow (C_4H_9)_3N^+ - H\ Cl^-$$

Examples of Class 3 include epoxides, alkenes, cyclic esters, and certain organometallic compounds which react with acids such as hydrogen chloride to give a harmless neutral compound. Other examples include acid anhydrides and reactive alcohols, e.g., benzhydrol. Class 3 mechanisms are illustrated below:

$$CH_3-\overset{O}{\overset{/\backslash}{CH-CH_2}} + HCl \longrightarrow CH_3-\underset{\underset{OH}{|}}{CH}-CH_3$$

$$CH_3CH=CH_2 + HCl \longrightarrow CH_3-\underset{\underset{Cl}{|}}{CH}-CH_3$$

$$CH_3-\underset{\underset{H}{|}}{\overset{O}{\overset{/\backslash}{C}}}-C=O + HCl \longrightarrow CH_3-\underset{\underset{H}{|}}{\overset{Cl}{\overset{|}{C}}}-CO_2H$$

$$(C_4H_9)_2Sn(SC_{12}H_{25})_2 + HCl \longrightarrow$$
$$(C_4H_9)_2SnCl(SC_{12}H_{25}) + C_{12}H_{25}SH$$

The decomposition inhibitors which are most preferred may be selected from phosphites, such as Weston 618 ® and Weston 619 ® available from Borg Warner Corp. Weston 618 ® has the following structural formula:

$$C_{18}H_{37}O-P\overset{O}{\underset{O}{<}}\bowtie\overset{O}{\underset{O}{>}}P-OC_{18}H_{37}$$

Weston 619 ® has the same formula as Weston 618 ® and it further includes about 1 percent triisopropanolamine. Other decomposition inhibitors include fatty acid salts such as calcium stearate; fatty amines such as octadecylamine; alkanol amines such as triethanolamine and triisopropanolamine; polyalkylene glycols such as polyethylene glycol, polypropyleneglycol, crown ethers and nonionic surfactants. Other di-acetal decomposition inhibitors which may be used include phosphates, aminoacids, hydroxycarbonyl compounds, dicarbonyl compounds, hydroxycarboxylic acids and polyhydroxy compounds.

The composition of the present invention may be obtained by adding a desired amount of the di-acetal and the di-acetal decomposition inhibitor directly to the polymer, and merely mixing the resulting composition by any suitable means. Alternatively, a concentrate containing as much as about 10 percent by weight of the di-acetal and as much as 10 percent by weight of the di-acetal decomposition inhibitor in a polymeric masterbatch may be prepared and be subsequently mixed with the resin.

Other additives such as a transparent coloring agent or plasticizers (e.g., dioctyl phthalate, dibutyl phthalate, dioctyl sebacate, or dioctyl adipate), can be added to the composition of the present invention so long as they do not adversely affect the improvement of transparency of the product. It has been found that plasticizers such as those exemplified above may in fact aid in the improvement of the transparency by the di-acetal.

With regard to other additives it may also be desirable to employ the di-acetals disclosed above in combination with other convetional additives having known transparency improving effects such as, for instance, para-t-butylbenzoic acid, its salts, low molecular weight waxy polypropylene and the like. In such applications, generally at least about 10 percent, preferably about 25 percent, or even about 50 percent or more of the clarity improving component will be the di-acetals of the present invention, with the remainder being comprised of other known clarifying agents, plasticizers, etc.

The composition of the present invention is suitable as a packing material and container material for cosmetics and foodstuffs because it gives films, sheets or hollow articles having improved transparency characteristics and superior mechanical and chemical properties.

The following examples further illustrate the present invention and are not to be construed as limiting the invention which is defined in the appended claims in any manner. All parts and percents given in these examples are by weight unless otherwise indicated.

EXAMPLE 1

A concentrate was prepared by mixing the following components in a laboratory blender:
 100 grams linear, low density polyethylene available from Union Carbide (G-Resin ®7144)
 2.5 grams di(p-chlorobenzylidene)sorbitol
 2.5 grams Weston 619 ®

The concentrate was then added to 895 grams of G-Resin ®7144 and thoroughly stirred in a Welex mixer at 1000 rpms for 5 minutes. The mixture was then extruded at 465° F. and injection molded at 450° F. into plaques of approximately 50 mil thickness.

The haze value as measured by ASTM Standard Test Method D1003–61 "Haze and Luminous Transmittance of Transparent Plastics" was 47 percent.

EXAMPLE 2

A sample of linear, low density polyethylene (G-Resin ®7144) from the same procedure set forth in Example 1. The sample had a haze value of 97 percent.

EXAMPLE 3

Example 1 was repeated with the deletion of the Weston 619 ® as a component of the concentrate. The haze value was 97 percent.

EXAMPLES 4–10

In Examples 4–7 the procedure of Example 1 was repeated in each instance with the substitution of a variety of di-acetal decomposition inhibitors for the Weston 619 ® used in Example 1. The specific inhibitors and the amount employed are set forth in the following Table:

TABLE

| Example No. | Inhibitor | Concentration (%) | Haze (%) |
| --- | --- | --- | --- |
| 4 | Calcium Stearate | .10 | 55 |
| 5 | Octadecyl Amine | .10 | 55 |
| 6 | Tri-isopropanolamine | .08 | 62 |
| 7 | Crown Ether (15-Crown-5) | .10 | 39 |
| 8 | α Hexadecene epoxide | 0.25 | 67 |
| 9 | Thermolite ® 31* | 0.25 | 48 |
| 10 | Tinuvin ® 770 | 0.25 | 40 |

TABLE-continued

| Example No. | Inhibitor | Concentration (%) | Haze (%) |
|---|---|---|---|
| | (bis-2,2,6,6-tetramethyl-4-piperidinyl sebacate) | | |

*an organo tin stabilizer available from M & T Chemicals, Inc. Rahway, New Jersey

What is claimed is:

1. A polyolefin plastic composition having improved transparency, which comprises:
   (a) a major portion of a linear, low density polyethylene polymer;
   (b) a di-acetal of sorbitol and an aromatic aldehyde in an amount sufficient to improve transparency characteristics;
   (c) a di-acetal decomposition inhibitor selected from metal sequestrants and acid neutralizers in an amount sufficient to inhibit decomposition of said di-acetal; and
   (d) said linear, low density polyethylene polymer further containing high acid catalyst residue in an amount sufficient to cause decomposition of said di-acetal.

2. The composition of claim 1 wherein said decomposition inhibitor is a metal sequestrant.

3. The composition of claim 1 wherein said decomposition inhibitor is an acid neutralizer.

4. The composition of claim 1 wherein said di-acetal is selected from dibenzylidene sorbitol; di-p-chlorobenzylidene sorbitol; di-m-chlorobenzylidene sorbitol; O-benzylidene-O-p-chlorobenzylidene sorbitol; di-m-bromobenzylidene sorbitol; bis(3,4-dichlorobenzylidene) sorbitol; and di-tolylidene sorbitol.

5. the composition of claim 4 wherein said di-acetal is di-p-chlorobenzylidene sorbitol.

6. The composition of claim 2 wherein said sequestrant is selected from phosphites, carboxylic acid salts, amines, salts of amino acids, polyalkylene glycols, phosphates, phosphines, hydroxy carbonyl compounds, dicarbonyl compounds, polyhydroxy compounds, crown ethers, hydrazones and hydrazides.

7. The composition of claim 3 wherein said acid neutralizer is selected from amines, alkenes, epoxides, strained cyclic esters, organo metallics, acid anhydrides and reactive alcohols.

* * * * *